United States Patent
Glenn, II et al.

[11] Patent Number: 5,852,724
[45] Date of Patent: Dec. 22, 1998

[54] SYSTEM AND METHOD FOR "N" PRIMARY SERVERS TO FAIL OVER TO "1" SECONDARY SERVER

[75] Inventors: Fletcher M. Glenn, II, Danville; Bruce D. Parker, Pleasanton, both of Calif.

[73] Assignee: Veritas Software Corp., Mountain View, Calif.

[21] Appl. No.: 664,437

[22] Filed: Jun. 18, 1996

[51] Int. Cl.$^6$ ............................. G06F 13/38; G06F 15/17
[52] U.S. Cl. ............................. 395/200.69; 395/200.59; 395/200.56; 395/182.05
[58] Field of Search ..................... 395/200.31, 200.54, 395/200.59, 200.55, 200.69, 200.33, 182.02, 182.05, 182.11, 182.15, 200.56

[56] References Cited

U.S. PATENT DOCUMENTS

| | | | |
|---|---|---|---|
| 5,157,663 | 10/1992 | Major et al. ............................. | 371/9.1 |
| 5,390,324 | 2/1995 | Burckhartt et al. ..................... | 395/575 |
| 5,408,649 | 4/1995 | Beshears et al. ....................... | 395/575 |
| 5,526,492 | 6/1996 | Ishida ................................... | 395/182.11 |
| 5,566,297 | 10/1996 | Devarakonda et al. ............ | 395/182.11 |
| 5,652,908 | 7/1997 | Douglas et al. ........................ | 395/800 |
| 5,668,943 | 9/1997 | Attanasio et al. .................. | 395/182.05 |
| 5,675,723 | 10/1997 | Ekrot et al. .......................... | 395/182.02 |

*Primary Examiner*—Mark H. Rinehart
*Attorney, Agent, or Firm*—Carr & Ferrell LLP

[57] ABSTRACT

The present invention is directed toward a system and method for server back-up. A set of Primary servers and at least on secondary server is coupled to a set of networks. Each server has a host file module for assigning it a common node name and a unique node name. Each server has a high availability module for transmitting a server status over a network. The primary servers each have a set of services operating on their respective networks. The secondary server has a duplicate set of each service running on each primary server. Upon detecting a primary server status which indicates that a primary server is inoperative, the secondary server starts the duplicate set of the primary set of services corresponding to the now inoperative primary server.

23 Claims, 9 Drawing Sheets

SYSTEM AND METHOD FOR "N" PRIMARY SERVERS TO FAIL OVER TO "1" SECONDARY SERVER

BACKGROUND OF THE INVENTION

1. Field of the Invention

The present invention relates generally to systems and methods for enterprise data management and more particularly, for providing fail over capability from "n" primary computer network servers to one secondary server.

2. Description of the Background Art

Networked client/server computer systems are becoming increasingly more common as the "Information Revolution" occurring throughout the world progresses. In a client/server network, one or more servers run a set of services which are accessible via a network to one or more client applications running on client systems. Such services may include database management, Network Information Services (NIS), and Network File System (NFS) programs. The value of data passed over such networks varies widely, requiring different strategies for ensuring that the client applications continue to be served in the event of a server's failure.

For instance, financial data networks are some of the most valuable and require high availability of their mission-critical applications, databases and services. An hour of downtime can literally mean hundreds of thousands of dollars in lost revenues. In such mission-critical data networks, an asymmetric server arrangement is typically employed. This means that each primary server has its own dedicated secondary server which assumes network services upon a primary server failure. Since servers are typically by far the most expensive item in a data network, asymmetrically backed up networks are often twice as expensive as they need to be, since only rarely will the secondary server be brought on-line. Thus, except for transitory periods when the primary server is "down," these secondary servers remain idle for most of their operational lives. Not surprisingly, most enterprises find it very difficult to justify the expense of purchasing such rarely used secondary servers.

What is needed is a system and method which significantly reduces the costs associated with mission-critical networks by replacing them with networks where only one secondary server is required to back-up any number of primary servers.

SUMMARY OF THE INVENTION

The present invention is a system and method for "n" primary servers to fail over to "1" secondary server. "Fail over" is a phrase for when a primary computer relinquishes control of a network to a back-up computer. The system includes a set of primary servers and a secondary server connected by a set of networks. The set of primary servers provide services to a plurality of client applications over a public network. One secondary server is provided as a back-up for the set of primary servers. Both the set of primary servers and the secondary server are assigned a common node name by which services running on the servers and client applications accessing the public network address the servers. Each server also has a unique node name by which the other servers connected to it over a private network may monitor the status of each other. Upon detecting a primary server failure, the secondary server takes control of the public network. Due to the common node name, the secondary server can take control of several primary servers servicing different public networks.

The method of the present invention first assigns a common internal node name to each of a set of primary servers and a secondary server. Next, a unique private network node name is assigned to each of the set of primary servers and to the secondary server. If a primary server's failure is detected over a private network by monitoring the status of its unique private network node, then primary services on the primary server are shutdown. Afterwards, a duplicate set of primary services are activated on the secondary server.

DETAILED DESCRIPTION OF THE PREFERRED EMBODIMENT

Figure 1:
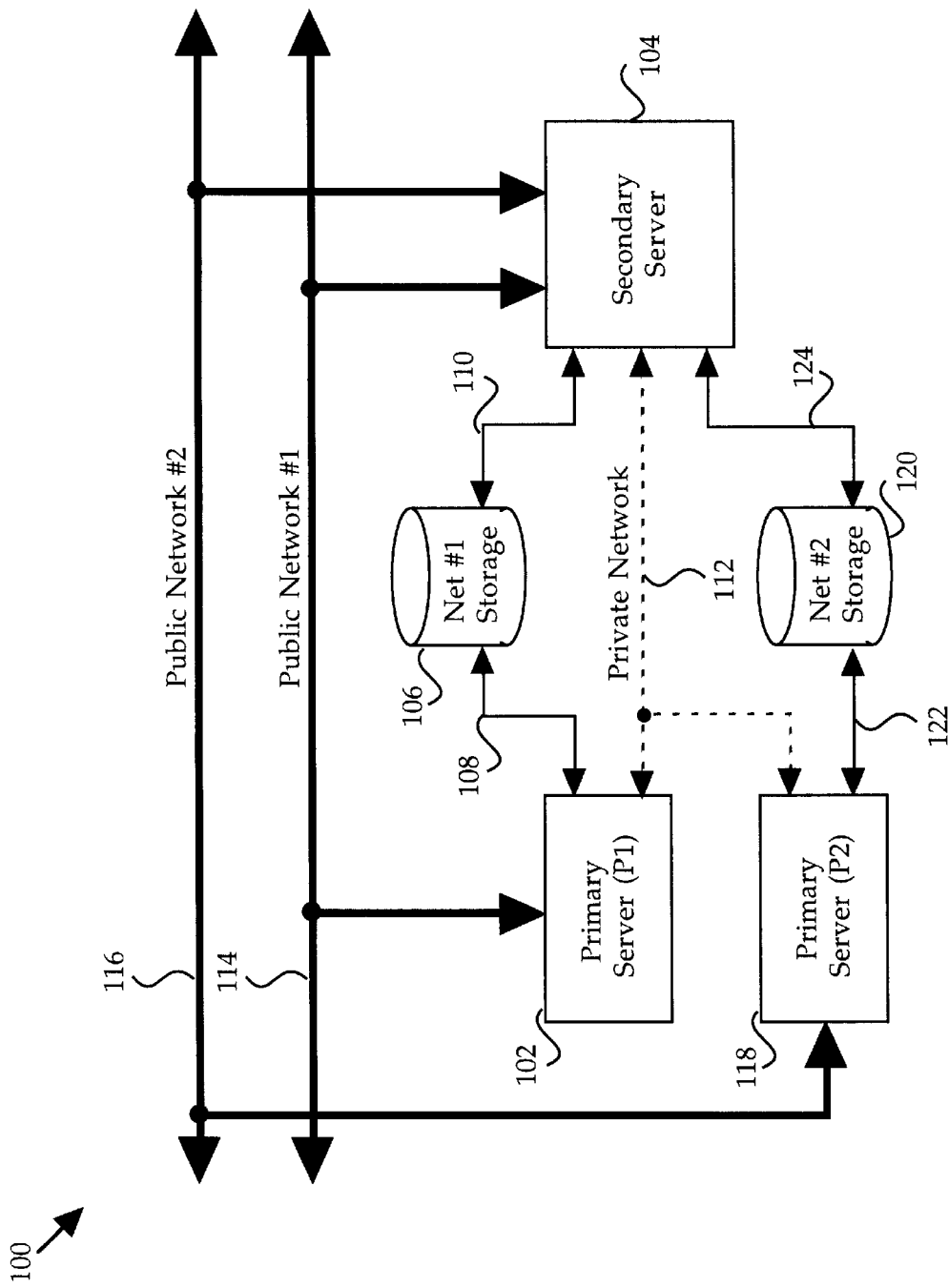
FIG. 1 is a block diagram illustrating a preferred system for providing fail over capability between two primary computer network servers and one secondary server.

Referring now to FIG. 1, a block diagram illustrating a preferred system 100 for providing fail over capability between two primary computer network servers and one secondary server is shown. "Fail over" is a phrase for when a primary computer relinquishes control of a network to a back-up computer. The system 100 comprises a primary server (P1) 102, a secondary server 104, a network #1 storage 106, a storage bus 108, a storage bus 110, a private network 112, a public network #1 114, a public network #2 116, a primary server (P2) 118, network #2 storage 120, a storage bus 122 and a storage bus 124. The P1 102, P2 118 and the secondary server 104 are preferably conventional servers (such as SPARCcenter 2000's, manufactured by Sun Microsystems of Mountain View, Calif.), preferably running a UNIX based multitasking operating system (such as Solaris, manufactured by SunSoft Corp.). The P1 102, P2 118 and the secondary server 104 preferably contain identical operating software, providing client applications (not shown) on either public network 114, 116 access to services. The P1 102 is coupled to the public network #1 114 for providing a first set primary services to the client applications on the public network #1 114. The P2 118 is coupled to the public network #2 116 for providing a second set primary services to the client applications on the public network #2 116. The secondary server 104 is coupled to both networks 114, 116 for respectively providing the first and second set of primary services to the client applications on both networks 114, 116, should either or both the P1 102 and the P2 118 unexpectedly fail or be forced to shut down. The secondary server 104 is chosen for sufficient operating capacity to perform in parallel all P1 102 and P2 118 functions. Both networks 114, 116 preferably conform to ISO/OSI (International Standards Organization / Open System Interconnection) standards.

The P1 102 is coupled to the network #1 storage device 106 via the storage bus 108. The secondary server 104 is coupled to the network #1 storage device 106 via the storage bus 110. The network #1 storage 106 is preferably a non-volatile information storage device, such as a hard disk drive, for storing databases and files accessed over the public network #1 114. A "database" is a collection of related objects (such as tables, forms, reports, queries and scripts) created and organized by a database management system. A "file" is a discrete collection of information typically stored on a disk. Since databases and files present a different paradigm for organizing information, they require different accessing and storage methods.

Both the storage bus 108 and the storage bus 110 preferably conform to Small Computer System Interface (SCSI) parallel interface standards (also known as ANSI X3T9.2). The P1 102 and the secondary server 104 are preferably coupled via the private network 112 so as to remain in constant communication with each other as is discussed in detail below. The private network 112 preferably conforms to Transmission Control Protocol/Internet Protocol (TCP/IP) standards.

The P2 118 is coupled to the network #2 storage device 120 via the storage bus 122. The secondary server 104 is coupled to the network #2 storage device 120 via the storage bus 124. The network #2 storage 120, the storage bus 122 and the storage bus 124 preferably and respectively share the same characteristics as the network #1 storage 106, the storage bus 108 and the storage bus 110 above, except that now they operate to support the public network #2 116. The P2 118 is also preferably coupled to the private network 112 so as to remain in constant communication with the secondary server 104.

Figure 2:
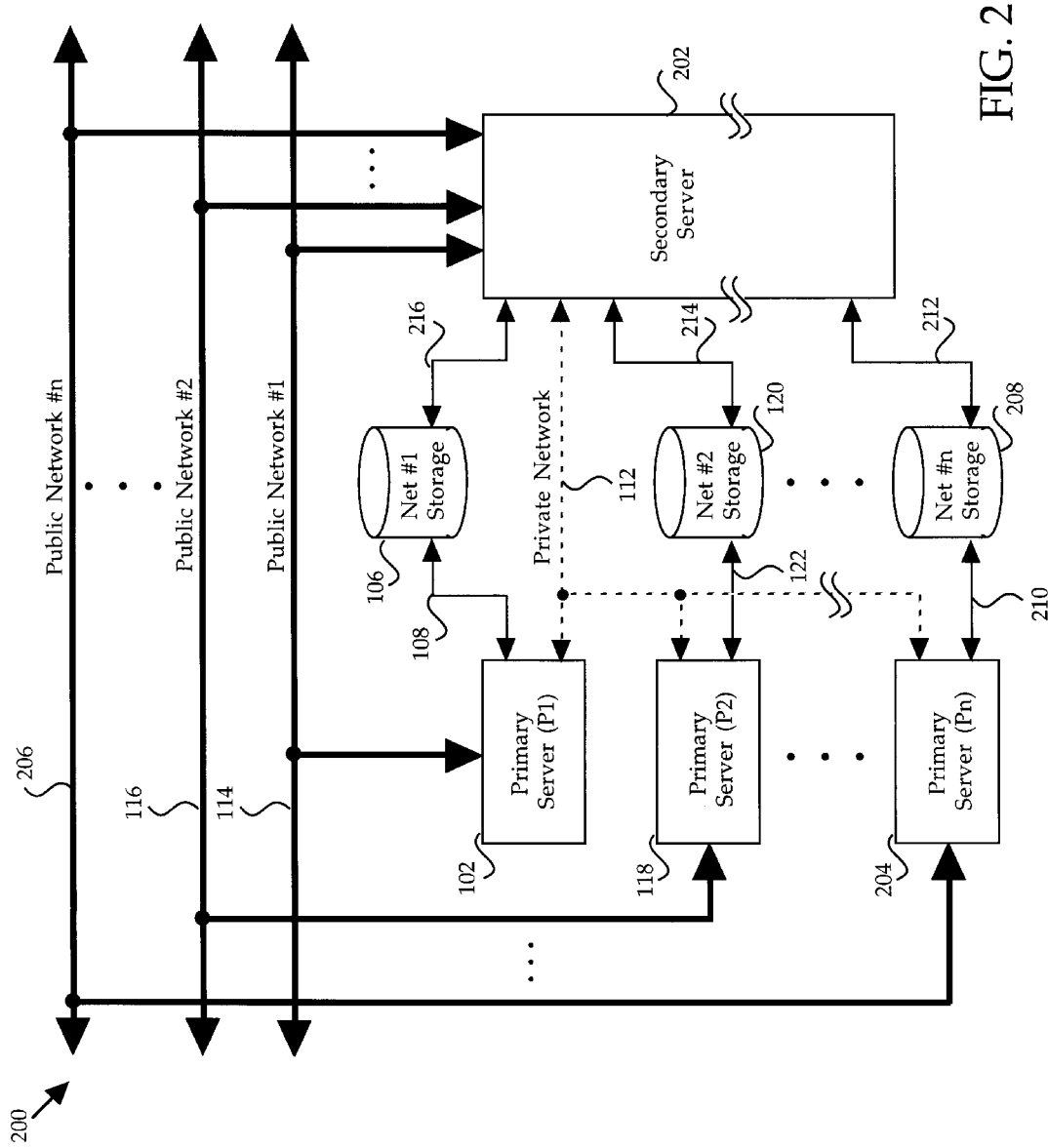
FIG. 2 is a block diagram illustrating a first alternate system for providing fail over capability between "n" primary computer network servers and one secondary server.

Referring now to FIG. 2, a block diagram illustrating a first alternate system 200 for providing fail over capability between "n" primary computer network servers and one secondary server is shown. In the discussion that follows "n" can be any integer number. The first alternate system 200 is comprised of all the elements in FIG. 1, except the secondary server 104 and its associated storage buses 110, 124. The first alternate system 200 additionally comprises a primary server (Pn) 204 and a network #n storage 208, coupled by a storage bus 210, an secondary server 202, coupled to the network #1 storage 106 by a storage bus 216, to the network #2 storage 120 by a storage bus 214, and to the network #n storage 208 by a storage bus 212. The Pn 204 is coupled to the public network #n 206 for providing an "nth" set of primary services to the client applications on the public network #n 206. The secondary server 202 is coupled to all the networks 114, 116, 206 for respectively providing the first, second, and nth set of primary services to the client applications on each of the networks 114, 116, 206 should one or more of the primary servers 102, 118, 204 unexpectedly fail or be forced to shut down. The secondary server 202 is chosen for sufficient operating capacity to perform in parallel all primary server 102, 118, 204 functions. Both the Pn 204 and the secondary server 202 are also coupled to the private network 112. Each of the above mentioned devices preferably retain the characteristics of their counter part devices discussed in FIG. 1.

Figure 3:
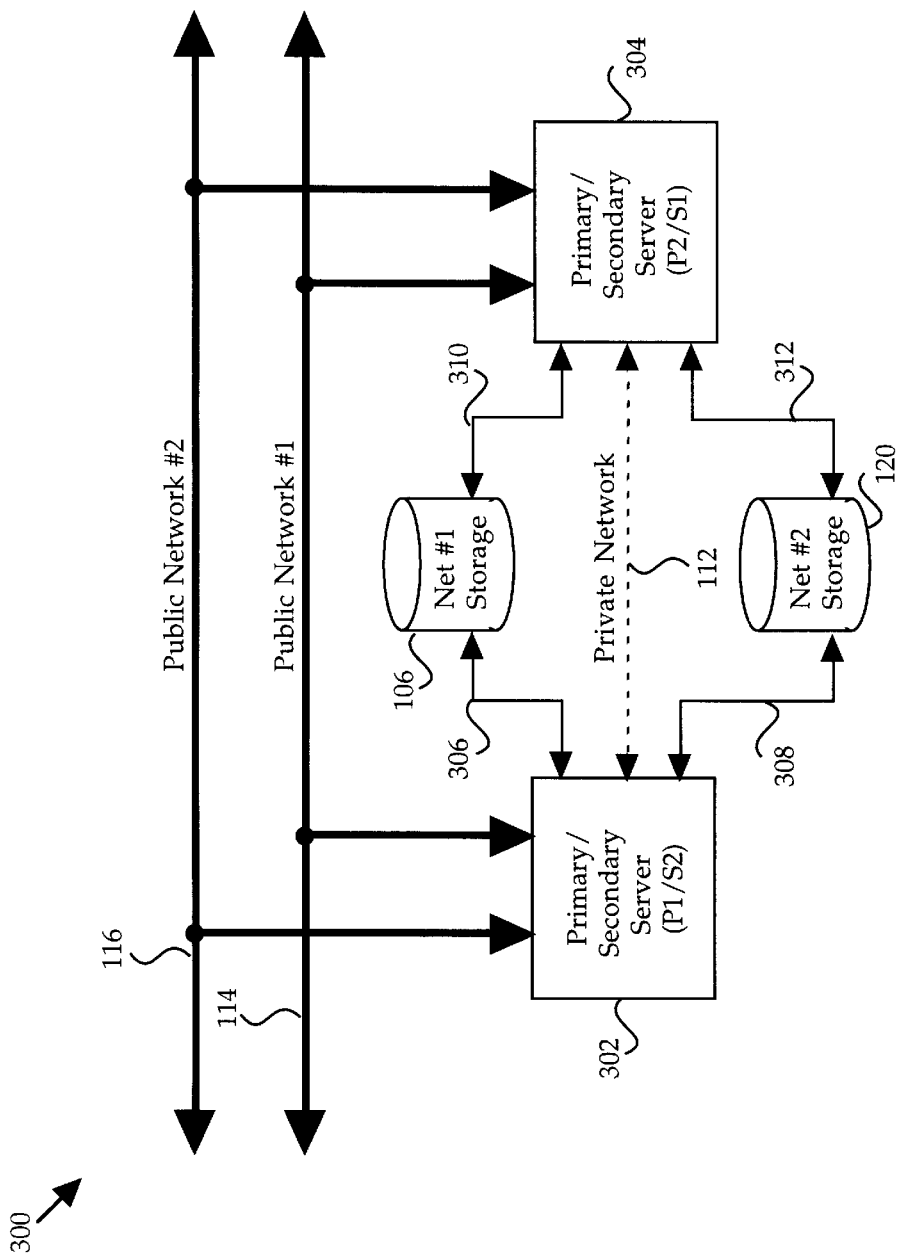
FIG. 3 is a block diagram illustrating a second alternate system for providing fail over capability between two primary computer network servers.

Referring now to FIG. 3, a block diagram illustrating a second alternate system 300 for providing fail over capability between two primary computer network servers is shown. The system 300 comprises a primary/secondary server (P1/S2) 302, a primary/secondary server (P2/Si) 304, a network #1 storage 106, a network #2 storage 120, a storage bus 306, a storage bus 308, a storage bus 310, a storage bus 312, a private network 112, a public network #1 114, and a public network #2 116. The P1/S2 302 is coupled to the public network #1 114 for providing the first set primary services to the client applications on the public network #1 114 under normal conditions and to the network #2 116 for providing the second set primary services to the client applications on the public network #2 116 should the P2/Si 304 experience a failure or be forced to shut-down. The P2/Si 304 is coupled to the public network #2 116 for providing the second set primary services to the client applications on the public network #2 116 under normal conditions and to the network #1 114 for providing the first set primary services to the client applications on the public network #1 114 should the P1/S2 302 experience a failure or be forced to shut-down.

The P1/S2 302 is coupled to the network #1 storage device 106 via the storage bus 306 and to the network #2 storage device 120 via the storage bus 308. The P2/S1 304 is coupled to the network #2 storage device 120 via the storage bus 312 and to the network #1 storage device 106 via the storage bus 310. The P1/S2 302 and the P2/S1 304 are directly coupled via the private network 112. Each of the above mentioned devices preferably retain the characteristics of their counterpart devices discussed in FIG. 1.

Figure 4:
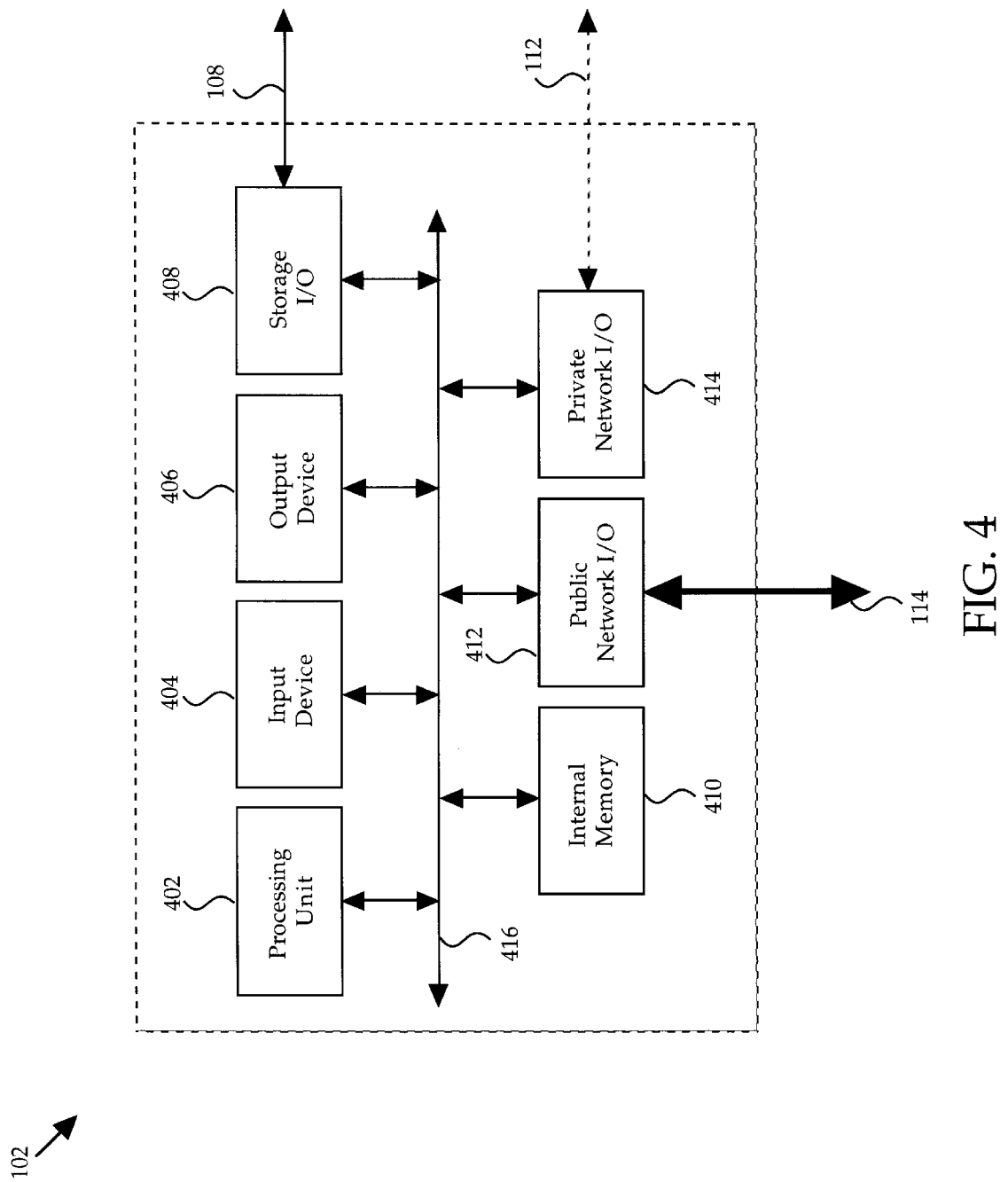
FIG. 4 is a block diagram illustrating a preferred embodiment of a server within the system of FIG. 1.

Referring now to FIG. 4, a block diagram illustrating a preferred embodiment of the servers 102, 104, 118, 202, 204, 302, 304 within the system of FIGS. 1, 2 and 3 are shown. For the purposes of the present discussion, only the P1 102 server will be discussed; however, since the other servers 104, 118, 202, 204, 302, 304 are preferably functionally similar in their operation, the present discussion extends to each of them as well. Any differences are discussed as appropriate. The P1 102 is preferably comprised of a processing unit 402, an input device 404, an output device 406, a storage I/O 408, an internal memory 410, a public network I/O 412 and a private network I/O 414, each coupled via an internal bus 416. Elements 402, 404, 406, 408, 412 and 414 are conventionally known. The internal memory 410, however, contains program instructions which are not conventionally known.

The processing unit 402 preferably executes program instructions stored in the internal memory 410 on a UNIX-based multitasking platform, as was discussed above. However, those skilled in the art will recognize that non-UNIX platforms are also acceptable. The input device 404 preferably comprises a keyboard and mouse for enabling the processing unit 402 to interpret commands and data entered by a user. The output device 406 is preferably a display monitor for displaying information received from the processing unit 402. The storage I/O 408 preferably provides an interface for storing information to and withdrawing information from the network #1 storage 106.

The internal memory 410 stores a set of computer readable program instructions for controlling how the processing unit 402 accesses, transforms and outputs data, as is described in detail below with reference to FIG. 5. The internal memory 410 preferably comprises both a volatile and a non-volatile portion. Those skilled in the art will recognize that in alternate embodiments the internal memory 410 could be supplemented with other computer useable mediums, including a compact disk, a hard drive, a memory card or an Internet site.

The public network I/O 412 interfaces the processing unit 402 with the public network #1 114. The private network I/O 414 interfaces the processing unit 402 with the private network 112 via the TCP/IP protocol introduced above. These network I/Os 412, 414 preferably interact with a hardware interface, generally implemented as a Network Interface Card (NIC), not shown. The NIC provides necessary signal translation between the P1 102 and the networks 112, 114.

Figure 5:
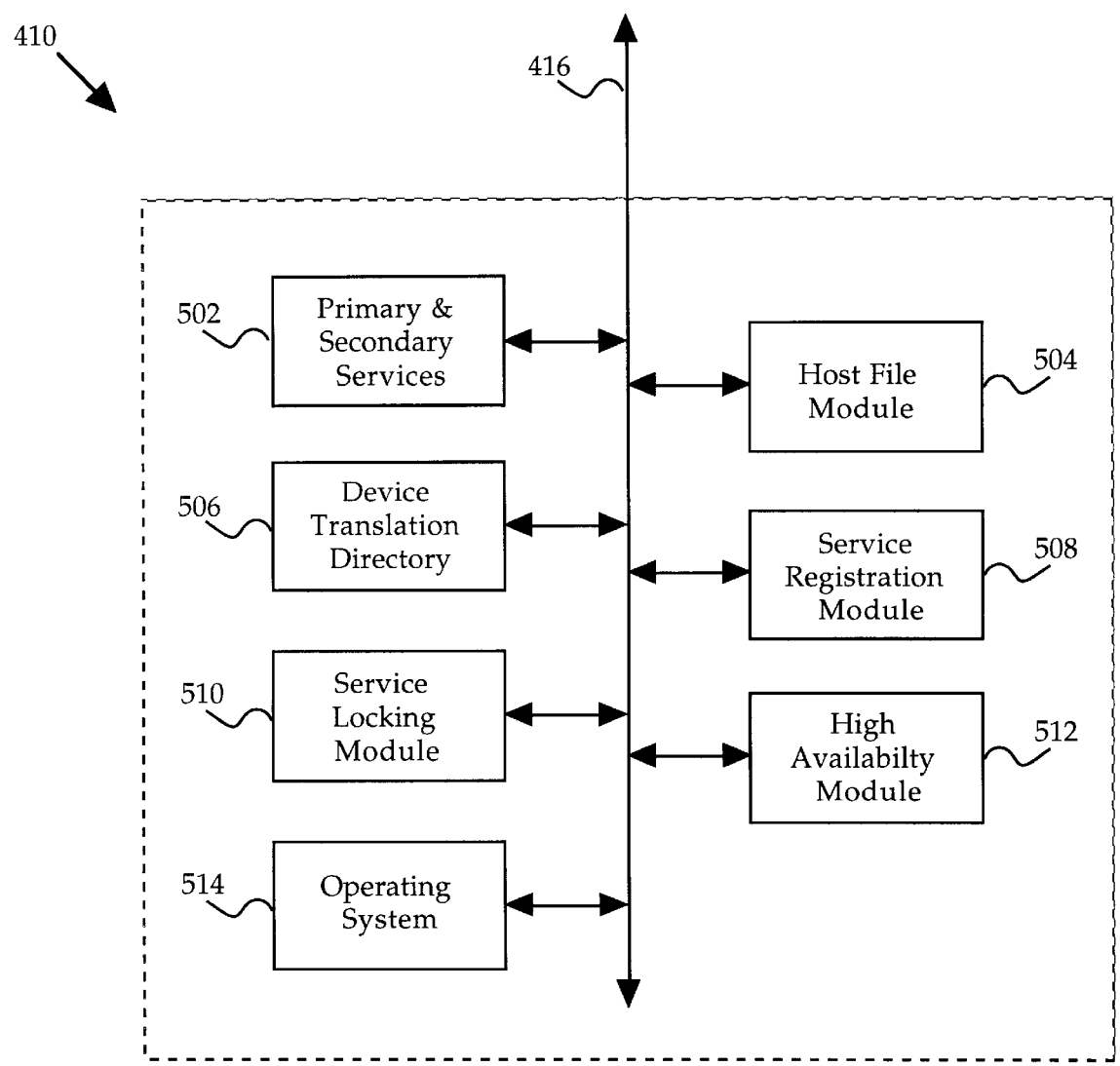
FIG. 5 is a block diagram illustrating a preferred embodiment of an internal memory within the server of FIG. 4.

Referring now to FIG. 5, a block diagram illustrating a preferred embodiment of software within the internal memory 410 within the P1 102 of FIG. 4 is shown. The internal memory 410 is structured with software which is comprised of a set of primary and secondary services 502, a host file module 504, a device translation directory 506, a service registration module 508, a service locking module 510, a high availability module 512 and an operating system 514 each coupled to the internal bus 416 and comprised of program instructions and registers for storing data. The operating system 514 is preferably a UNIX based Solaris 2.X multitasking operating system, comprising program instructions for performing many operating system tasks, including setting error or failure flags, when the P1 102 experiences a service interruption, providing network services, and controlling the configuration and usage of the P1 102 hardware and software resources. The details of operation for the rest of the above named elements is provided below.

Figure 6:
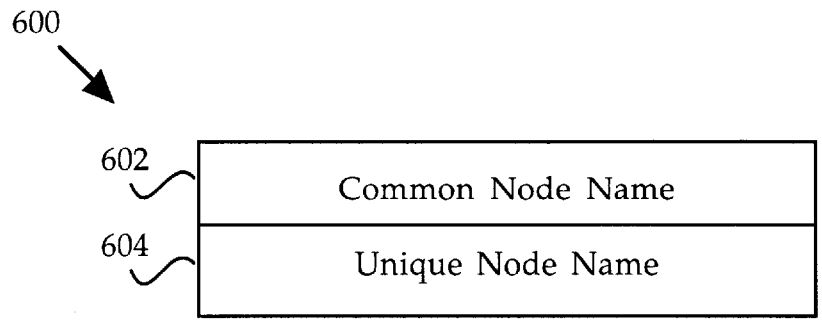
FIG. 6 is a preferred embodiment of a host file memory map within the host file module of FIG. 5.

Referring now to FIG. 6, a preferred embodiment of a host file memory map 600 within the host file module 504 of FIG. 5 is shown. The host file memory map 600 is comprised of a set of data fields 602 through 604 containing the following information: a common node name 602 and a unique node name 604. The function of each data field 602 through 604 is described in detail below.

Figure 7:
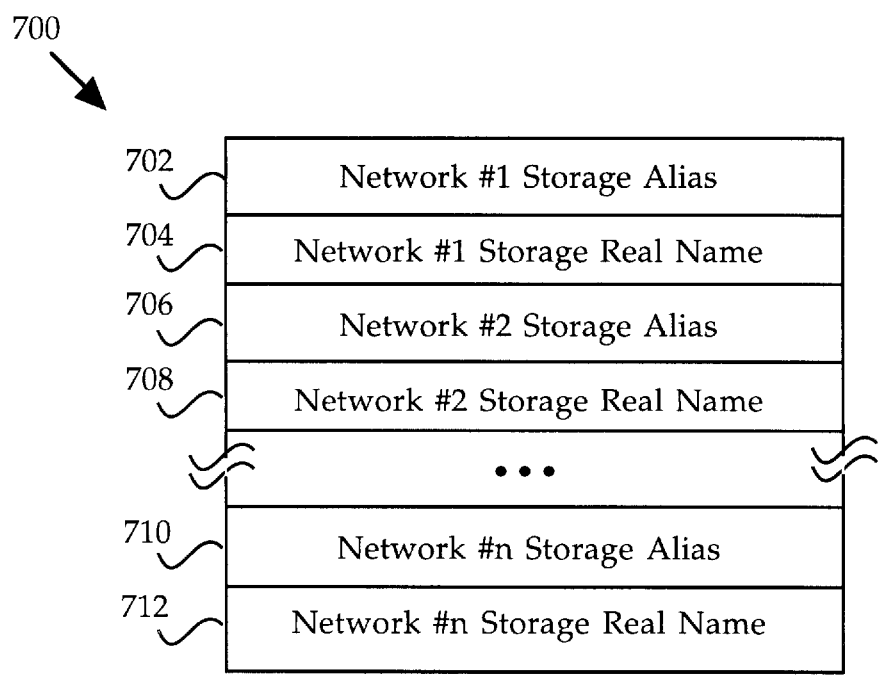
FIG. 7 is a preferred embodiment of a device translation directory memory map within the device translation directory of FIG. 5.

Referring now to FIG. 7, a preferred embodiment of a device translation directory memory map 700 within the device translation directory 506 of FIG. 5 is shown. The device translation directory memory map 700 is comprised of a set of data fields 702 through 712 containing the following information: a network #1 storage alias 702, a network #1 storage real name 704, a network #2 storage alias 706, a network #2 storage real name 708, a network #n storage alias 710, a network #n storage real name 712. One "alias"/"real name" pair is preferably assigned to each device connected to any SCSI bus. The function of each data field 702 through 712 is described in detail below.

The primary and secondary services 502 preferably comprise program instructions for providing services to client applications on the public network #1 114. Such services may include database services, network file system (NFS) services, network information services (NIS), file system services, including various daemon processes, well known by persons of ordinary skill in the art.

The host file module 504 preferably comprises program instructions for associating each primary server 102, 118, 204, 302, 304 and corresponding secondary server 104, 202, 302, 304 with: the common node name 602 as seen on the public networks 114, 116, 206 and by each primary server's primary and secondary services 502; and the unique node name 604 as seen on the private network 112. The common node name 602 shared between both the primary server and its secondary server, while a technical violation of network protocol, leads the primary and secondary services 502 to believe that they are being executed on the same server, regardless of the server on which they are actually running. More than one name may be used to refer to a particular server on the network 114, 116, 206. This is called "aliasing." Thus, the P1 102 may have a common node name 602 by which the services 502 and the client applications refer to the P1 102, and the P1 102 may have a unique node name 604 that identifies the P1 102 on the private network 112. For example, the P1 102 and the secondary server 104 may be assigned the common node name 602 "abe." Furthermore, the P1 102 may be assigned the unique node name 604 "alpha" and the secondary server 104 may be assigned the unique node name 604 "beta." Any services 502 accessible via the public network #1 114 or client applications accessing either the P1 102 or the secondary server 104 over the public network #1 114 identify either server 102, 104 by the common node name 602 of "abe." However, when the P1 102 contacts the secondary server 104 over the private network 112, the P1 102 identifies the secondary server 104 by the unique node name 604 of "beta." Similarly, when the secondary server 104 contacts the P1 102 over the private network 112, the secondary server 104 identifies the P1 102 by the unique node name 604 of "alpha."

The device translation directory 506 preferably comprises program instructions (i.e. "softlinks") for associating an alias with a real name for each device connected to the storage buses 108, 110, 122, 124, 210, 212, 214, 216, 306, 310, 308, 312. Whether the primary and secondary services 502 are operating on either a primary server (such as the P1 102) or a secondary server (such as the secondary server 104), the services 502 still refer to a shared device's (such as the network #1 storage 106) on either storage bus (such as either the storage bus 108 or the secondary server storage bus 110) by the shared device's "alias" (such as the network #1 storage alias). However, after the service 502 specifies the shared device's "alias," the device translation directory 506 accesses the device translation directory memory map 700 to look up the shared device's "real name" so that the shared device may be uniquely addressed. In the example scenario above, when the P1 102 refers to the network #1 storage alias 702, the device translation directory 506 accesses the network #1 storage real name 704 from the device translation directory memory map 700 before actually sending a command or data to the network #1 storage 106. Those skilled in the art recognize that the method described above also applies to when services 502 refer to the network #2 storage 120 (reference the network #2 storage alias 706 and the network #2 storage real name 708 pair), the network #n storage 208 (reference the network #n storage alias 710 and the network #n storage real name 712 pair), or any other device connected to an SCSI bus.

The service registration module 508 preferably comprises program instructions for preventing services 502 from blindly starting or shutting down daemon processes that are shared by other services 502 currently operating on the same server. As a new service 502 is attempting to "start" on a server, the new service's 502 daemon processes are registered with that server's service registration module 508. If the service registration module 508 determines that two daemon processes are registered with the same name on the same server, the duplicate daemon process is prevented from starting. For instance, if a service "A" and its associated daemon "1" process are currently operating on the secondary server 104 as a result of the P1 102 having failed, then service "A's" start script will register both the service "A" and the daemon "1" process with the secondary server 104's service registration module 508. Since no other registrations of daemon "1" process currently exist within the service registration module 508, daemon "1" process will be permitted to start. Similarly, if the P2 118 has failed, requiring that a service "B" and its associated daemon #1 process be activated on the secondary server 104, then service "B's" start script will register both the service "B" and daemon "1" process with the secondary server 104's service registration module 508. Thus, daemon "1" process is now registered within the service registration module 508 twice. In response, the service registration module 508 prevents starting of another daemon "1" process and both services "A" and "B" will use the same, currently active daemon "1" process.

Similarly, when a service 502 is "stopped" on a server, the service's 502 associated daemon processes will be stopped on that server only if one instance of that daemon process is currently registered within the service registration module 508. However, if more than one instance of that daemon process is currently registered, that daemon process will not be stopped on the server. However, the registration for the daemon process associated with the service 502 that is stopping will be deleted from the service registration module 508. For instance, if a service "A" and its associated daemon "1" process are currently operating on the secondary server 104 as a result of the P1 102 having earlier failed, then both the service "A" and daemon "1" process will be registered with the secondary server 104's service registration module 508. After the P1 102 has been repaired and service "A" is to be reactivated on the P1 102, service "A" will be stopped on the secondary server 104. As service "A's" stop script is executed, the stop script will look for and remove its own registration from the secondary server's 104 service registration module 508. If only that one instance of daemon "1" process was registered with the secondary server's 104 service registration module 508, then the stop script will also remove the daemon "1" processes on the secondary server 104. However, if more than one instance of daemon "1" process was registered with the secondary server's 104 service registration module 508, then the stop script will not remove the daemon "1"processes on the secondary server 104, since daemon "1"process is required by other services 502 currently operating on the secondary server 104.

The service locking module 510 preferably comprises program instructions for providing a service with exclusive access to a resource (such as a file, daemon process or device). A "lock" is preferably comprised of a process ID, identifying a service or process that currently holds the lock, plus a time-stamp, indicating when the lock will expire. For instance, if service "A" and service "B" begin to start the same daemon "1"process, and only one copy of the daemon "1"process is permitted, then both services will attempt to obtain a lock on the daemon "1"process. If service "A" is first to obtain the lock, then service "A" starts the daemon "1" process before releasing the lock. Service "B" now gets the lock, but determines that the daemon "1" process has already been started. As a result, service "B" releases the lock without starting another daemon "1" process. Locks are also inheritable, for those instances where an unbroken chain of control is required. A service or process that currently holds the lock is able to pass forward the lock to another service or process.

The high availability module 512 preferably comprises program instructions for transmitting "heartbeats" between a primary server (such as the P1 102) and a secondary server (such as the secondary server 104) and for either "normally" or "automatically" "failing-over" services from one server to another. A "heartbeat" is defined as a status message which contains information on a server's ability to perform its own public network 116 or housekeeping tasks as well as its ability to assume the public network 116 or housekeeping tasks of another server. The heartbeats are preferably transmitted in both directions between the primary and secondary servers over the private network 112. "Normal" fail overs typically occur when preventative maintenance is to be performed on a primary server. "Automatic" fail overs typically occur when a primary server has experienced a serious failure or error condition.

During a "normal" (i.e. "commanded") fail over, a primary server to be shut-down executes a stop script for each service that the primary server is currently supporting. Each service's stop script deletes its own entries from the primary server's service registration module 508 as it stops. In response to an "automatic" (i.e. "unplanned") fail over, the secondary server waits for a predetermined time period for the failed primary server to execute a stop script for each of the primary server's services. If the secondary server determines (via the heartbeats) that this has not occurred, the secondary server forces a halt to the primary server's services and deletes from the failed primary server's service registration module 508 all of the services currently registered there. If the primary server is equipped with an Uninterruptable Power Supply (UPS) or battery backed up power, the secondary server also causes power to be removed from the primary server. After the primary server and its services have been stopped, the secondary server high availability module 512 initiates a start script for each service to be failed-over to the secondary server. After each service is started the secondary server takes control over the public network.

The high availability module 512 of a secondary server also monitors its own status to determine if the secondary server has the excess capability to assume the public network operations of a failed primary server. In the preferred embodiment, the high availability module 512 is partially based upon an "AXXiON-HA" fail over software, (manufactured by OpenVision TECHNOLOGIES, Inc., headquarters in Pleasanton, Calif.).

Those skilled in the art recognize that by replacing all references to the P1 102 with a reference to any of the other servers 104, 118, 202, 204, 302, 304, replacing all references to the public network #1 114 with a reference to any of the other public networks 116, 206, replacing all references to the network #1 storage 106 with a reference to any of the other network storage devices 120, 208, and replacing all references to the storage bus 108 with a reference to any of the other storage buses 110, 122, 224, 212, 214, 216, 306, 308, 310, 312 will describe how to make and use these other elements of the present invention, with exceptions only as discussed elsewhere in this specification.

Figure 8:
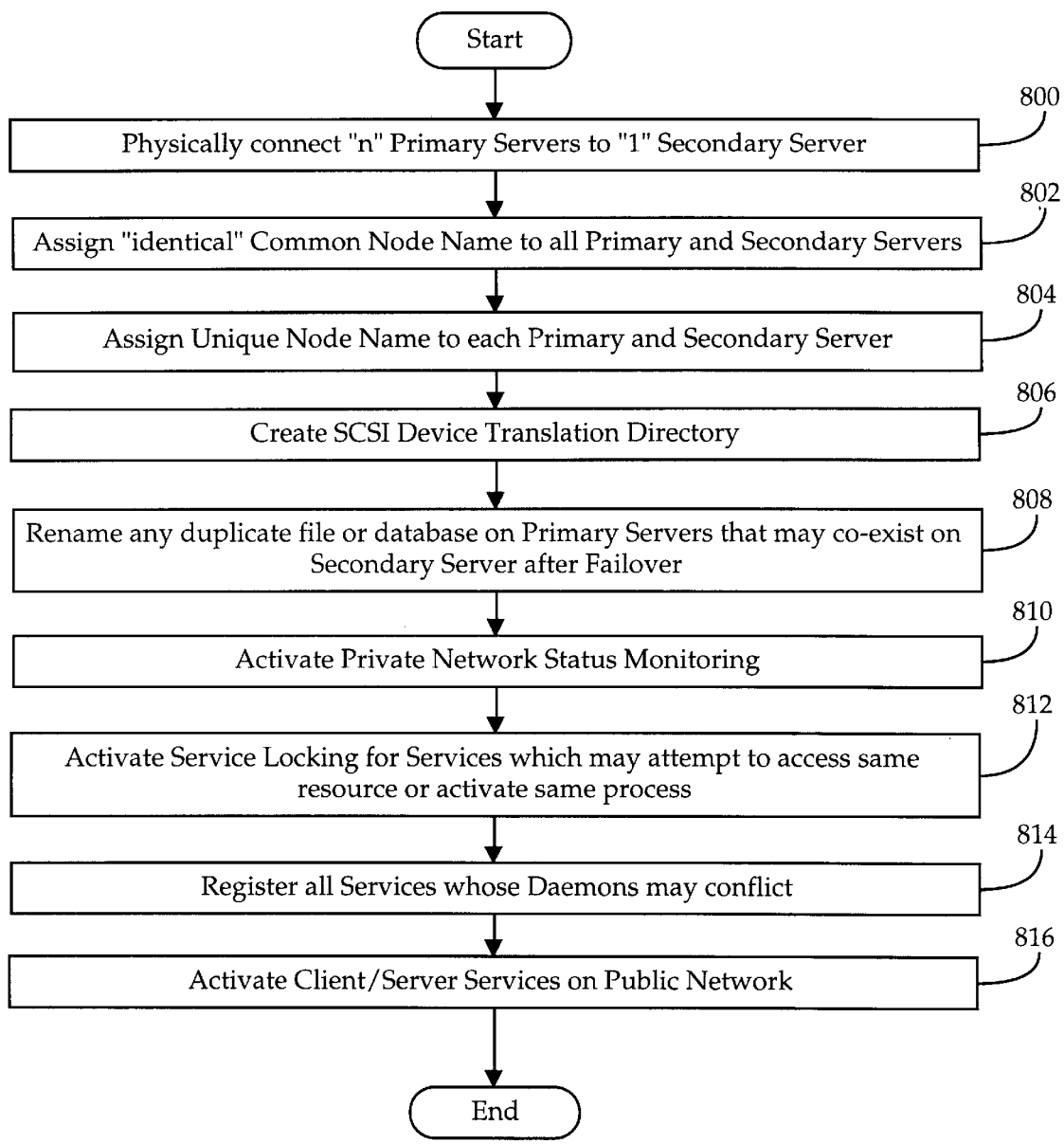
FIG. 8 is a flowchart illustrating a preferred method for setting up a fail over capability between two or more primary computer network servers and one secondary server.

Referring now to FIG. 8, a flowchart illustrating a preferred method for setting up a fail over capability between two or more primary computer network servers and one secondary server is shown. The preferred method starts in step 800 where an integer number "n" primary servers are connected to at least one secondary server, such as shown in FIG. 2 for example. In step 802, each server is assigned a common node name 602 by the host file module 504. In step 804 a unique node name 604 is assigned to each server by the host file module 504. Next in step 806 the device translation directory 506 is created. In step 808 the service registration module 508 renames any duplicate file or database on a primary server that may co-exist on a secondary server after "fail over." In step 810 each server activates its high availability module 512 to begin private network 112 status monitoring. Next in step 812 the service locking module 510 is activated to prevent services from activating multiple instances of the same resource or process on the secondary server. In step 814 all services register their daemon processes with the service registration module 508 of the server on which the daemon processes will operate on. Lastly, in step 816, the primary and secondary services 502 are brought on-line to begin providing services to the public network. After step 816, the preferred method for setting up a fail over capability ends.

Figure 9:
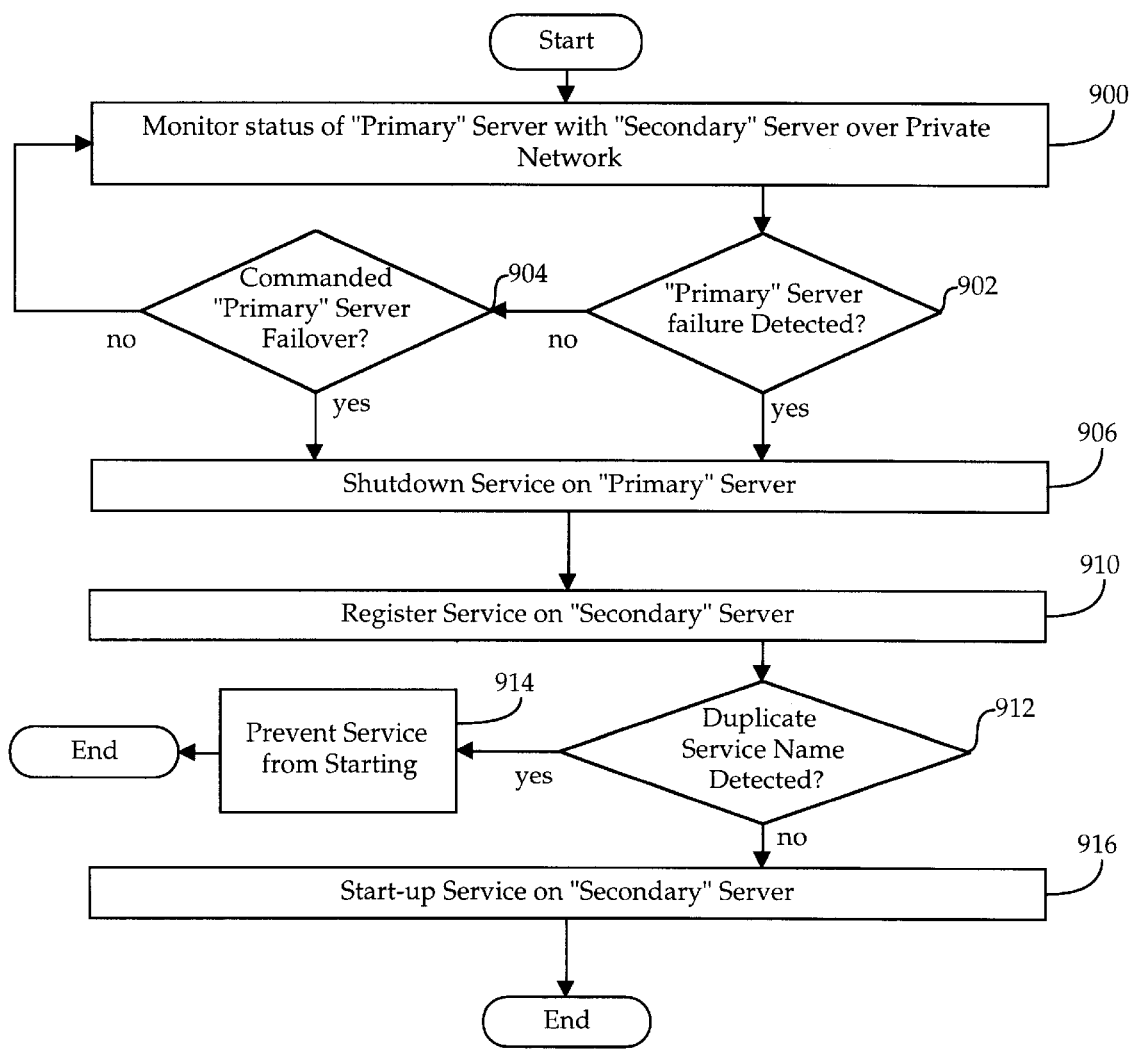
FIG. 9 is a flowchart illustrating a preferred method for failing-over a primary service on a primary server to a secondary server.

Referring now to FIG. 9, a flowchart illustrating a preferred method for failing-over a primary service 502 from a primary server to a secondary server is shown. The preferred method starts with step 900 where a secondary server's high availability module 512 monitors the status of a primary server over the private network 112. If in step 902, the secondary server detects an unplanned primary server failure, the method proceeds to step 906, else the method proceeds to step 904. If in step 904, the secondary server detects a commanded primary server fail over, the method proceeds to step 906, else the method returns to step 900. In step 906, the primary server activates a stop script for each service 502 currently active on the primary server. However, if the primary server is not able to activate the stop scripts, the secondary server, after a predetermined time-out, forces the services 502 on the primary server to shut-down. In step 910 the secondary server's service registration module 508 registers each service 502 to be activated on the secondary server. If in step 912, the service registration module 508 detects a duplicate service name registered on the secondary server, the method proceeds to step 914, else the preferred method proceeds to step 916. In step 914, the service registration module 508 prevents the duplicate service 502 from starting, afterwhich the preferred method ends. In step 916, the service registration module 508 permits the service 502 to start on the secondary server, afterwhich the preferred method ends.

Figure 10:
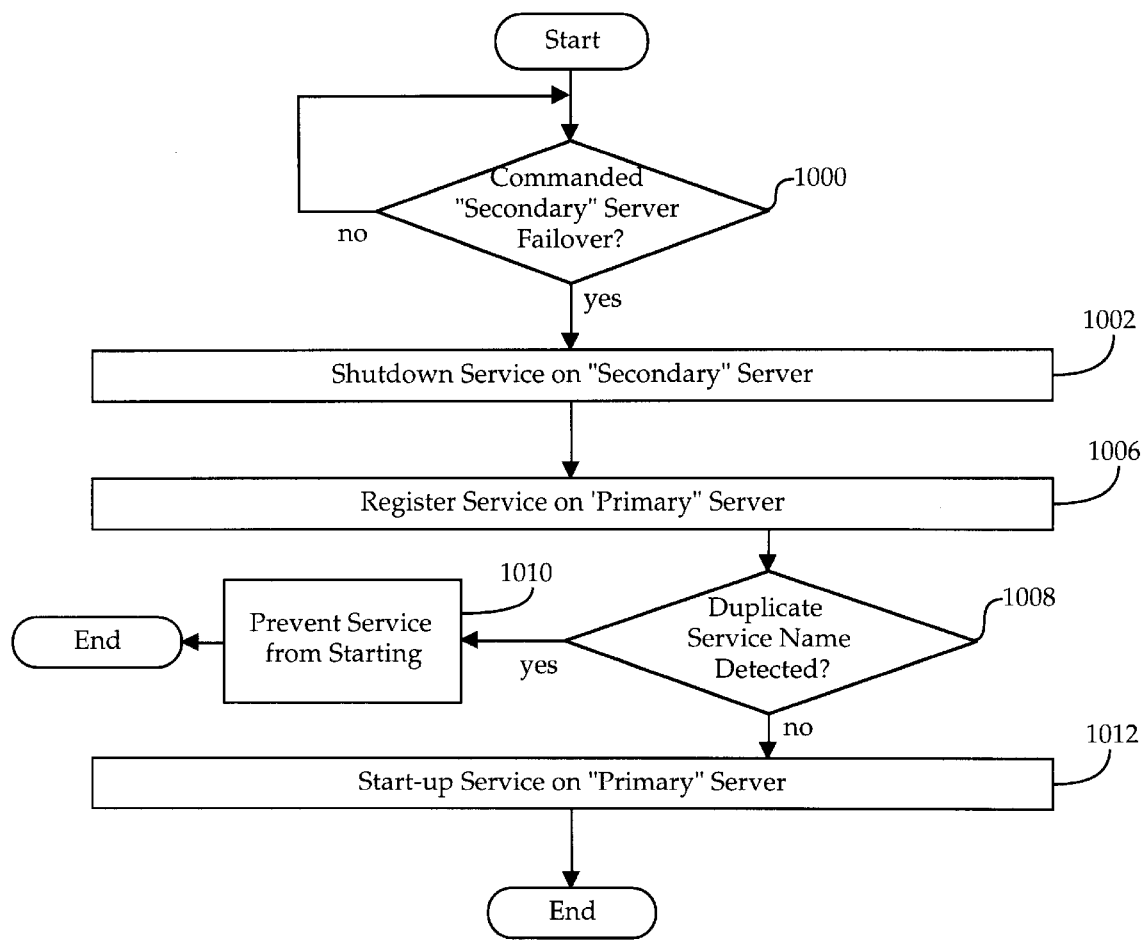
FIG. 10 is a flowchart illustrating a preferred method for restoring a primary service from a secondary server to a primary server.

Referring now to FIG. 10, a flowchart illustrating a preferred method for restoring a service from a secondary server to a primary server is shown. The preferred method starts in step 1000, where in step 1000, if the secondary server is commanded to fail over services to the primary server (such as after the primary server has undergone routine maintenance), the method proceeds to step 1002, else the method returns to step 1000. In step 1002, the secondary server activates a stop script for each service 502 currently active on the secondary server. In step 1006 the primary server's service registration module 508 registers each service 502 to be activated on the primary server. If in step 1008, the service registration module 508 detects a duplicate service name registered on the primary server, the method proceeds to step 1010, else the preferred method proceeds to step 1012. In step 1010, the service registration module 508 prevents the duplicate service 502 from starting, after which the preferred method ends. In step 1012, the service registration module 508 permits the service 502 to start on the primary server, after which the preferred method ends.

While the present invention has been described with reference to certain preferred embodiments, those skilled in the art will recognize that various modifications may be provided. Variations upon and modifications to the preferred embodiments are provided for by the present invention, which is limited only by the following claims.

What is claimed is:

1. In a client-server data processing system having client applications for generating requests, a system for server back-up, the system comprising:
   a network;
   a primary server coupled to the network, the primary server including:
   a primary host file module for assigning a common node name to the primary server;
   a primary high availability module for transmitting a primary server status over the network; and
   a primary set of services responsive to the common node name, coupled to the primary host file module, for responding to requests from the client applications; and
   a secondary server coupled to the network, the secondary server including:
   a secondary host file module for assigning the common node name to the secondary server;
   a duplicate set of the primary set of services responsive to the common node name, coupled to the secondary host file module, for responding to requests from the client applications; and
   a secondary high availability module, coupled to the secondary host file module, for starting the duplicate set of the primary set of services in response to the primary server status indicating that the primary server is inoperative;
   wherein said common node name is used by said primary set of services and by said duplicate set of the primary set of services to reference said primary server and said secondary server;
   whereby the primary set of services continue to be provided over the network even though the primary server has failed.

2. The system of claim 1, further comprising:
   a second network; and
   a second primary server coupled to the second network, the second primary server including:
   a second primary host file module for assigning the common node name to the second primary server;
   a second primary high availability module for transmitting a second primary server status over the second network; and
   a second primary set of services responsive to the common node name, coupled to the second primary host file module, for responding to requests from the client applications;
   wherein the secondary server further includes:
   a duplicate set of the second primary set of services responsive to the common node name, coupled to the secondary host file module, for supporting the second network;
   wherein the high availability module starts the duplicate set of the second primary set of services in response to the second primary server status indicating that the second primary server is inoperative; and
   where in the secondary server provides back-up for both the primary server and the second primary server concurrently.

3. The system of claim 2, wherein
   the primary host file module assigns a unique node name to the primary server and identifies the primary server status using the unique node name; and
   the second primary host file module assigns a second unique node name to the second primary server and identifies the second primary server status using the second unique node name;

whereby the high availability module of the secondary server may distinguish between the primary server status and the second primary server status.

4. The system of claim 3, further comprising a private network coupled to the primary server, the second primary server and the secondary server for transmitting status messages from the primary server and the second primary server to the secondary server.

5. The system of claim 4, wherein the secondary high availability module identifies a status message on the private network as the primary server status if accompanied by the unique node name and identifies a status message on the private network as the second primary server status if accompanied by the second unique node name.

6. The system of claim 1, further comprising:

a network storage for storing a set of information;

a storage bus coupled to the network storage, the primary server and the secondary server for enabling the primary and secondary servers to access the set of information.

7. The system of claim 6, wherein:

the primary server further includes a device translation directory, coupled to the primary set of services, for associating an alias with a real name for addressing the network storage;

wherein the primary set of services executing on the primary server address the network storage by the alias, and the device translation directory translates the alias into the real name before actually addressing the network storage; and the secondary server further includes a second device translation directory coupled to the duplicate set of the primary set of services for associating the alias with a second real name for the network storage;

wherein the primary set of services executing on the secondary server address the network storage by the alias, and the second device translation directory translates the alias into the second real name before actually addressing the network storage.

8. The system of claim 2, wherein the secondary server further includes a service registration module, coupled to the duplicate set of the primary set of services and the duplicate set of the second primary set of services, for preventing the duplicate set of the second primary set of services from starting or shutting down daemon processes that are shared by the duplicate set of the primary set of services.

9. The system of claim 2, wherein the secondary server further includes a service locking module, coupled to the duplicate set of the primary set of services and the duplicate set of the second primary set of services, for providing the duplicate set of the primary set of services with access to a resource while preventing the duplicate set of the second primary set of services from accessing the resource.

10. A computer implemented method for server back-up, comprising the steps of:

assigning a common node name to both a primary server and a secondary server;

activating a primary set of services on the primary server, wherein the primary set of services are responsive to the common node name;

detecting a condition on the primary server which requires activation of a duplicate set of the set of primary services on the secondary server;

deactivating the primary set of services on the primary server in response to the detecting step; and activating the duplicate set of the set of primary services on the secondary server, wherein the duplicate set of the set of primary services are responsive to the common node name.

11. The method of claim 10, further comprising the steps of:

assigning the common node name to a second primary server;

activating a second primary set of services on the second primary server responsive to the common node name;

detecting an error condition on the second primary server;

deactivating the second primary set of services in response to the detecting step; and activating a duplicate set of the second primary set of services on the secondary server responsive to the common node name.

12. The method of claim 11, further comprising the step of operating both the duplicate set of the primary set of services and the duplicate set of the second primary set of services on the secondary server.

13. The method of claim 10, wherein the detecting step further comprises the step of detecting an unplanned condition on the primary server.

14. The method of claim 10, wherein the detecting step further comprises the step of detecting a planned condition on the primary server.

15. The method of claim 10, further comprising the steps of:

assigning a unique primary node name to the primary server; and identifying the primary server on a private network by the unique primary node name;

wherein the detecting step further includes monitoring the primary server over the private network for failure conditions.

16. The method of claim 10, wherein the activating a duplicate set of the set of primary services on the secondary server step further comprises the steps of: registering daemon processes within the duplicate set of the set of primary services on the secondary server;

checking for multiple instances of a daemon process;

preventing the daemon process from starting if multiple instances of the daemon process are registered; and permitting the daemon process to start if only one instance of the daemon process is registered.

17. The method of claim 10, further comprising the step of:

creating a device translation directory; and using the device translation directory to address a network storage device.

18. A system for server back-up, comprising:

means for assigning a common node name to a primary server and a secondary server;

means for activating a primary set of services on the primary server responsive to the common node name;

means for detecting an error condition on the primary server;

means for deactivating the primary set of services in response to the means for detecting; and means for activating a duplicate set of the set of primary services on the secondary server responsive to the common node name.

19. The system of claim 18, further comprising:

means for assigning the common node name to a second primary server;

means for activating a second primary set of services on the second primary server responsive to the common node name;

means for detecting an error condition on the second primary server;

means for deactivating the second primary set of services in response to the means for detecting; and means for activating a duplicate set of the second primary set of services on the secondary server responsive to the common node name.

20. The system of claim 18, further comprising:

means for assigning a unique primary node name to the primary server; and means for identifying the primary server on a private network by the unique primary node name;

wherein the means for detecting further includes means for monitoring the primary server over the private network for failure conditions.

21. A computer useable medium having computer readable program code embodied therein, the program code causing a computer to enable server fail over by performing steps comprising:

assigning a common node name to a primary server and a secondary server;

activating a primary set of services on the primary server responsive to the common node name;

detecting an error condition on the primary server;

deactivating the primary set of services in response to the detecting step; and activating a duplicate set of the set of primary services on the secondary server responsive to the common node name.

22. The computer useable medium of claim 21, further comprising program code for performing steps comprising:

assigning the common node name to a second primary server;

activating a second primary set of services on the second primary server responsive to the common node name;

detecting an error condition on the second primary server;

deactivating the second primary set of services in response to the detecting step; and activating a duplicate set of the second primary set of services on the secondary server responsive to the common node name.

23. The computer useable medium of claim 21, further comprising program code for performing steps comprising:

assigning a unique primary node name to the primary server; and identifying the primary server on a private network by the unique primary node name;

wherein the detecting step further includes monitoring the primary server over the private network for failure conditions.

\* \* \* \* \*